United States Patent [19]

Sekiguchi et al.

[11] Patent Number: 4,709,844
[45] Date of Patent: Dec. 1, 1987

[54] PRESSURE WELDING BONDING APPARATUS

[75] Inventors: Yukio Sekiguchi, Higashimatsuyama; Hiroyasu Funakubo, Tokyo; Hitoyuki Sakanoue; Osamu Komura, both of Itami, all of Japan

[73] Assignees: Life Technology Research Found.; Hiroyasu Funakubo & Sumitomo Elec. Ind., Ltd., both of Tokyo, Japan

[21] Appl. No.: 839,180

[22] Filed: Mar. 13, 1986

[51] Int. Cl.$^4$ ............................................. B23K 20/00
[52] U.S. Cl. ..................................... 228/3.1; 228/4.1; 228/221
[58] Field of Search ................. 228/3.1, 221, 121, 6.1, 228/173.2, 203, 4.1, 45, 47, 20, 44.3, 49.1, 49.2; 29/722; 100/70 R

[56] References Cited

U.S. PATENT DOCUMENTS 4,166,563  9/1979  Peyraud ............................. 228/221

FOREIGN PATENT DOCUMENTS 2281635   3/1976  France ................................. 29/722
56-53886  5/1981  Japan .................................. 228/3.1
60-187485 9/1985  Japan .................................. 228/3.1
1166947   7/1985  U.S.S.R. ............................. 228/221

Primary Examiner—Nicholas P. Godici
Assistant Examiner—G. M. Reid
Attorney, Agent, or Firm—Wenderoth, Lind & Ponack

[57] ABSTRACT

The bonding apparatus has a holding device, a pressing device for pressure welding substances to be bonded to each other, and a superhigh vacuum bonding chamber provided with the holding device and the pressing device. A superhigh vacuum bonding preparatory chamber is connected with the superhigh vacuum bonding chamber through a gate valve and a conveyor is arranged for conveying the substances to be bonded between the superhigh vacuum bonding preparatory chamber and the superhigh vacuum bonding chamber. The preparatory chamber is provided with a rotary preparatory table having a plurality of stages for releasably supporting holders for holding the substances to be bonded, the preparatory table being moved to successive positions to register with the conveyor.

8 Claims, 4 Drawing Figures

PRESSURE WELDING BONDING APPARATUS

BACKGROUND OF THE INVENTION

1. Field of the Invention

The present invention relates to the bonding of metals, the bonding of ceramics or the bonding of ceramics to metals and the like, and in particular to a bonding apparatus suitable for the bonding of parts of precision machines.

2. Description of the Related Art

It is known that the pressure welding of, for example, metals is possible by moving spaced apart surfaces to be pressure welded toward each other, at which an interatomic force of gravity can act.

However, since a surface coat such as an oxidized coat or a nitrified coat usually exists on a metal surface, it is difficult to pressure weld metals to each other.

Thus, a method, in which surfaces to be pressure welded are held at high temperatures and the diffusion bonding of materials having a surface coat that does not have strong chemical bonds therein is carried out by utilizing the diffusion phenomenon of said surfaces to be pressure welded, has been proposed as a general pressure welding method. This method is defective in that since the materials to be pressure welded are heated to temperatures near the recrystallization temperatures thereof, metallographical change and thermal strain are produced in the portion bonded and as a result, it is unsuitable for the bonding of parts of precision machines requiring high accuracy.

On the other hand, a method has been proposed in which the surface coat layer is removed by friction between the surfaces to be pressure welded or by brushing the surfaces to be pressure welded with a metal brush instead of heat treating the surfaces and thus, pressure welding at high temperatures is rapidly carried out before the surface coat has formed again.

However, this method is also defective in that since a large strain and a great amount or heat are induced on the surfaces to be pressure welded, the dimensional change of the portions to be pressure welded is inevitable.

As described above, pressure welding is remarkably dependent upon the surface state of metals, so that it is almost impossible to perform in the event that the surface coat layer exists. Accordingly, pressure welding is possible if a clean surface, on which the surface coat layer does not exist, can be obtained. It is, however, remarkably difficult to remove a surface coat without imparting any strain to the surface, and it is difficult to remove the surface coat layer while imparting only a very remarkably small surface strain.

One of the present inventors found from his various investigations that metals can be readily bounded to themselves without any metallographical change or increase in thermal strain of the material pressure welded, or without any dimensional change of the portion pressure welded, or without requiring any special means such as means for heat treating the metals, by pressure welding them in a superhigh vacuum of $10^{-9}$ mmHg or more, after removing a metal surface coat by spattering using inert gas ions (Japanese Patent Application No. 53-32416).

However, since a bonding chamber must be returned to an almost atmospheric pressure condition when the substances to be bonded are put in or removed from the bonding chamber, it takes considerable amount of time to return the pressure inside of the bonding chamber to $10^{-9}$ mmHg or more when the substances are to be bonded. Accordingly, an improvement in productivity cannot be expected.

SUMMARY OF THE INVENTION

It is an object of the present invention to eliminate the above described defects and to provide an apparatus for bonding metals or ceramics or ceramics to metals and the like more effectively within a superhigh vacuum bonding chamber.

According to the invention a bonding apparatus comprising holding means for holding a substance to be bonded and a pressing means for pressure welding substances to be bonded to each other, is characterised by a superhigh vacuum bonding chamber provided with said holding means and said pressing means, a superhigh vacuum bonding preparatory chamber connected with said superhigh vacuum bonding chamber through a gate valve and a conveying means for conveying the substances to be bonded between said superhigh vacuum bonding preparatory chamber and said superhigh vacuum bonding chamber.

BRIEF DESCRIPTION OF THE DRAWINGS

The invention will now be described, by way of example with reference to the accompanying drawings, in which.

DETAILED DESCRIPTION OF THE PREFERRED EMBODIMENT

Figure 1:
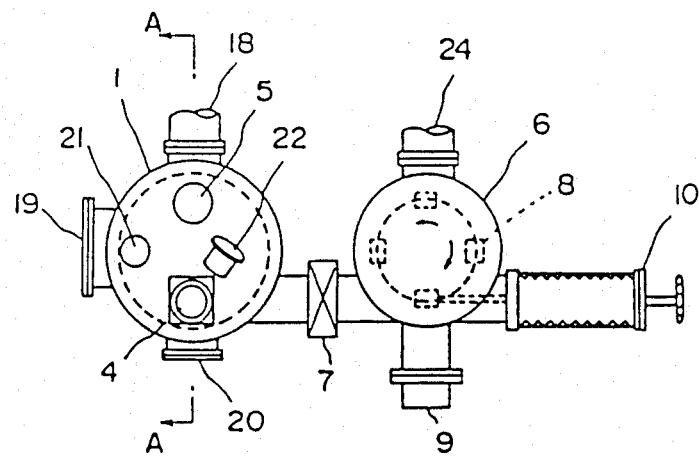
FIG. 1 is a plan view of an embodiment of the invention.
Figure 2:
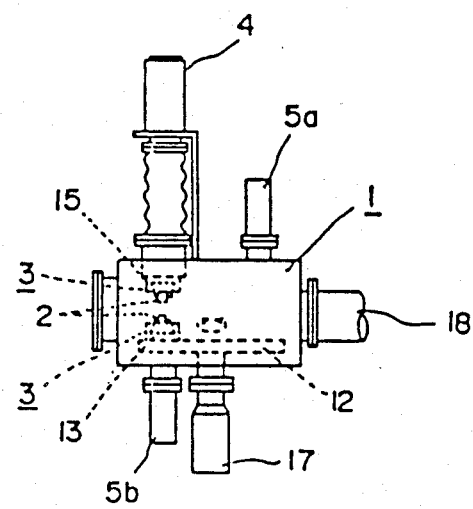
FIG. 2 is a side view of the apparatus of FIG. 1 taken along line A—A in FIG. 1.

The present embodiment is mainly comprised of the following four portions:

The first portion is a superhigh vacuum bonding chamber (hereinafter referred to simply as a bonding chamber) 1. The bonding chamber 1 is maintained under a superhigh vacuum of $10^{-9}$ mmHg or more and is provided with a holding means 3 for fixedly holding two substances 2 to be bonded, a pressing means 4 for generating a minute pressure, a differential pressure type spatter-etching means 5 capable of spatter-etching surfaces to be bonded with inert gas when the vacuum of $10^{-9}$ mmHg is maintained in order to make the surfaces to be bonded clean surfaces, and substantially ideal ones, prior to the bonding operation.

The second portion is a superhigh vacuum preparatory chamber (hereinafter referred to simply as a preparatory chamber) 6. The preparatory chamber 6 is maintained under a high vacuum of $10^{-8}$ mmHg or more and is cut off from the bonding chamber 1 by a gate valve 7. The preparatory chamber 6 communicates with an atmosphere when the substance 2 to be bonded is put in or removed but can be held under a superhigh vacuum after the substance 2 to be bonded has been mounted on a plurality of holders 8. Additionally, the preparatory chamber 6 is provided with a spatter-vapour coating apparatus 9 capable of coating a thin film on the surface of the substance 2 to be bonded.

The third portion is a conveying means 10 for conveying the substance 2 to be bonded from the preparatory chamber 6 and for mounting it on the holding means 3 of the bonding chamber 1.

Figure 3:
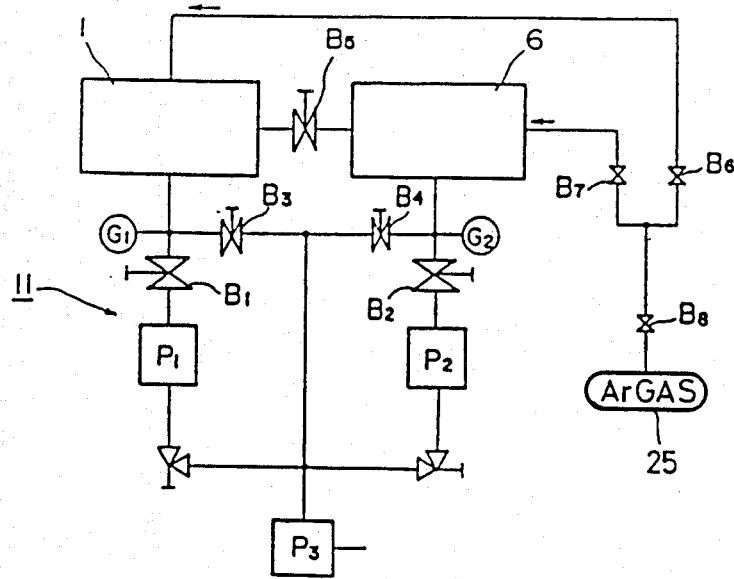
FIG. 3 is a diagram showing a superhigh vacuum evacuating apparatus used in an embodiment of the present invention.

The fourth portion is a superhigh vacuum evacuating apparatus 11 for producing a superhigh vacuum within the preparatory chamber 6 and the bonding chamber 1, as shown in FIG. 3.

Figure 4:
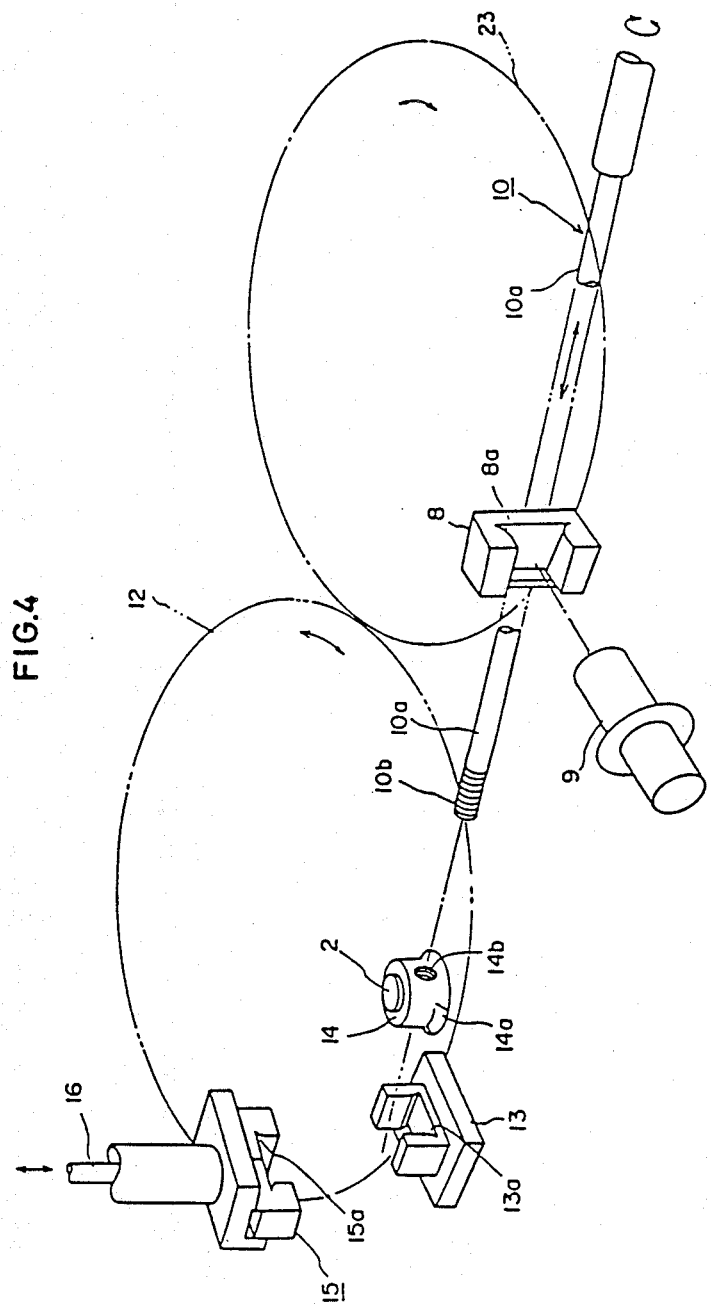
FIG. 4 is a fragmented perspective view of the principal parts explaining the operation of an embodiment of the present invention.

These portions will now be described in more detail. The bonding chamber 1 is generally cylindrical in shape and is provided with a rotary table 12 therein which is controlled so as to be rotatable through suitable angles by a rotary apparatus 17 arranged outside of the bonding chamber 1, if need arises. This rotary table 12 is provided with a stage 13 having an upwardly facing channel-shaped section fixedly mounted thereon as shown in FIG. 4. The holding means 3 for holding the substance 2 to be bonded is constructed to hold the substance 2 within the bonding chamber 1 by engaging a collar member 14a of a substance holder 14 with a groove 13a in stage 13. In addition, the bonding chamber 1 is provided in the upper portion thereof with a second stage 15 comprising a part of the holding means 3 facing the stage 13. The stage 15 has an inverted channel shape section, which is opposed to that of the lower stage 13, and is provided with a groove 15a so as to hold a holder 14 in the opposite direction. This stage 15 is connected with the pressing means 4, and is movable up and down, and is provided with a closing apparatus 16 for opening and closing the arms of the channel section stage 15.

The cylindrical preparatory chamber 6 is provided with a rotary table 23, which is similar to the rotary table 12 provided in the bonding chamber 1, four holders 8 being fixedly mounted on the rotary table 23 at regular intervals of 90°. These holders 8 have a channel-shaped section, which is generally the same as that of said substance to be bonded stage 13, as shown in FIG. 4. The holders 8 are fixedly mounted so that the open side of the channel-shape is directed sidewards, and the substance to be bonded 2 is held by engaging the collar member 14a of a holder 14 with a groove 8a of the holder 8. The preparatory chamber 6 is provided with the spatter-vapour coating apparatus 9 on the side thereof facing the holders 8, as the table 23 is turned, whereby a thin film can be coated on the surface of the substances 2 to be bonded which are mounted on a holder 8.

Also, the bonding chamber 1 is provided with the differential pressure type etching means 5 for etching the surface of the substance to be bonded 2 if necessary. Said differential pressure type etching means 5 has an upper spatter-etching apparatus 5a provided in the upper portion of the bonding chamber 1 at a side opposite to said stage 13 while a lower spatter-etching apparatus 5b is provided in the lower portion of the bonding chamber 1 facing the second stage 15. Additionally, the bonding chamber 1 is provided with an exhaust port 18 connected to said superhigh vacuum evacuating apparatus 11, operation-monitoring ports 19, 20, an instrument port 21, a surface analysis port 22 and the like.

The conveying means 10 is provided with a movable shaft 10a which is rotatable and movable in an axial direction, said movable shaft 10a passing through the side wall of the preparatory chamber 6. The shaft 10a is extendable to the stage 13 in the bonding chamber 1 through said holder 8 and said gate valve 7. This movable shaft 10a is provided with a screw member 10b at the forward end thereof, the substance 2 to be bonded being conveyed between the preparatory chamber 6 and the bonding chamber 1 by turning this screw member 10b in a complimentary screw member 14b of the holder 14. Furthermore, an exhaust port 24 is connected with the superhigh vacuum evacuating apparatus 11.

The superhigh vacuum evacuating apparatus 11, as shown in FIG. 3, comprises superhigh vacuum pumps $P_1, P_2$ capable of producing a vacuum of about $10^{-2}$ to $10^{-10}$ mmHg, a high vacuum pump $P_3$ capable of producing a vacuum of about $10^{-4}$ mmHg, vacuum gauges $G_1, G_2$, valves $B_1, B_2, B_3, B_4, B_5, B_6, B_7, B_8$ arranged between the pumps $P_1, P_2, P_3$, the bonding chamber 1, the preparatory chamber 6 and an argon gas bomb 25. The inside of the bonding chamber 1 and the preparatory chamber 6 are maintained at the desired vacuum and the bonding chamber 1 and the preparatory chamber 6 are simultaneously fed with argon gas used for ion-etching or ion-spatter vapour coating by appropriate opening and closing the various valves.

The operation of apparatus according to the present embodiment will now be described. At first, a superhigh vacuum atmosphere is produced in the bonding chamber 1 and the preparatory chamber 6. Then the preparatory chamber 6 is subjected to atmospheric pressure and a plurality of holders 14, on which the substance 2 to be bonded is mounted, are mounted on respective holders 8. After a plurality of substances to be bonded 2 are fixedly mounted on the holders 8, the desired superhigh vacuum is again produced in the preparatory chamber 6.

The surface of the substance 2 to be bonded can be subjected to the spatter-vapour coating within the vacuum preparatory chamber 6 if necessary. In this case, an inert gas such as argon gas is introduced into the preparatory chamber 6 under a vacuum of about $10^{-5}$ mmHg and a substance, a desired thin film, can be coated on the surface as a spatter-vapour coated film by use of this inert gas. After the spatter-vapour coated film is applied, a high vacuum of $10^{-8}$ mmHg is again produced within the preparatory chamber 6.

Upon completion of the operation in the preparatory chamber 6, the screw member 10b is turned within the screw member 14b of a holder 14 by rotating the movable shaft 10a and the holder 14 is removed from the holder 8 by axially moving the movable shaft 10a. Then the holder 14 is fixedly engaged with the stage 13 in the bonding chamber 1 by rotating the rotary table 23 in the preparatory chamber 6 by 45°, rotating the movable shaft 10a by 90°, and simultaneously opening the gate valve 7 to pass the holder 14 through the gate valve 7 and until the holder 14 engages the stage 13. After the holder 14 is fixed, the movable shaft 10a is rotated in the reverse direction to remove it from the holder 14 and the shaft 10a is returned to the original position in the preparatory chamber 6. Next, the rotary table 23 is further rotated by 45° and the pointed end of the movable shaft 10a is screwed into another holder 14, the movable shaft 10a being axially moved to remove the holder 14 from the holder 8, and the movable shaft 10a being rotated by 90°. At this juncture, in the bonding chamber 1, the rotary stage 12 has been rotated by 180° and the stage 15 has been lowered to a fixed position in alignment with the path of the shaft 10a. Subsequently, the movable shaft 10a is axially moved to fixedly mount the holder 14 onto the stage 15, the movable shaft 10a being rotated to be removed from the holder 14, the movable shaft 10a being returned to the original position in the preparatory chamber 6, and simultaneously the gate valve 7 being closed. Under this condition, one of the substances 2 to be bonded in the bonding chamber 1 is mounted on the pointed end portion of the pressing means 4 and the other one is mounted on the rotary stage 12. Accordingly, the surfaces of the substances 2 to be bonded are fixed at positions facing the upper and lower differential pressure type spatter-etching apparatus 5a,5b, respectively, so that the surfaces of the substances 2 to be bonded are subjected to the spatter-etching until a clean surface, which is substantially an ideal one, is obtained.

The substances 2 to be bonded, having the substantially ideal clean surfaces, are positioned face to face with each other by rotating the rotary stage 12 by 180°. Under this condition, minute pressure is imparted to both surfaces to be bonded by means of the pressing means 4 to carry out the bonding operation. After the completion of the bonding operation, the gate valve 7 between the bonding chamber 1 and the preparatory chamber 6 is opened and the movable shaft 10a is inserted and screwed in the holder 14 while the pressure is removed by the pressing means 4.

Such a conventional spatter-etching apparatus 5a,5b can carry out the spatter-etching by using an inert gas under a superhigh vacuum of $10^{-9}$ mmHg and can spatter-etch an area of a certain extent or more by surface-scanning.

Then, both arms of the stage 15 are opened by means of the closing apparatus 16 to loosen the engagement of the holder 14 with the stage 15, the movable shaft 10a being returned to the preparatory chamber 6, the holder 14 being engaged with the holder 8 in the preparatory chamber 6, and simultaneously the gate valve 7 being closed. Thus, both of the substances bonded are brought into the preparatory chamber 6 in a bonded condition and can be taken out of it by returning the pressure inside the preparatory chamber 6 to an atmospheric pressure.

Thus, the procedure occurring from the time the substance to be bonded is placed in the bonding chamber to the time it is removed from the bonding chamber is complete. A large number of bonded products can be obtained by repeating the above described procedure. Although the preparatory chamber 6 disclosed is provided with four holders 8 therein, so that two bonding operations can be carried out without returning the pressure inside the preparatory chamber 6 to atmospheric pressure, it goes without saying that a larger number of bonding operations can be continuously carried out by increasing the number of the holder 8 in the preparatory chamber 6.

As described above, according to the present invention, a bonding chamber can always be maintained under a superhigh vacuum and the inside of the bonding chamber can always be kept clean, so that not only can the inside of the bonding chamber be free from contaminated air but the time required for producing a superhigh vacuum atmosphere can also be shortened thereby effectively carrying out a superhigh vacuum bonding process.

We claim:

1. A bonding apparatus for bonding first and second substances to one another, said apparatus comprising:
   a vacuum bonding chamber in which the substances are bonded,
   said bonding chamber having a first stage means for releasably supporting the first substance when the substances are bonded, and a rotary table to which said first stage means is mounted;
   a vacuum preparatory chamber connected to said vacuum bonding chamber through a gate valve means and in which the substances are releasably supported;
   a conveying means for conveying the substances releasably supported in said preparatory chamber to said vacuum bonding chamber along a conveying path,
   said table being positionable between a predetermined position for disposing said first stage means at a first position in said conveying path and at least one other position for disposing the first stage means at a second position out of said conveying path, and said conveying means for transferring the first substance from said preparatory chamber to said first stage means along said conveying path when said first stage means is at said first position;
   a pressing means within said vacuum bonding chamber for releasably supporting the second substance, said pressing means being disposed within said vacuum bonding chamber adjacent said first stage means in said first position; and
   means for moving said pressing means to a second substance receiving position in said conveying path when said first stage means is in said second position, said conveying means for transferring the second substance from said preparatory chamber along said conveying path to said pressing means when the pressing means is in said receiving position, and for moving said pressing means when releasably supporting the second substance toward said first stage means when said first stage means is in said first position and releasably supports the first substance to press the second substance against the first substance.

2. A bonding apparatus as claimed in claim 1,
and further comprising respective holders on which the first and the second substances are mounted, and
wherein the holder to which the first substance is mounted is releasably supportable by said first stage means, and the holder to which the second substance is mounted is releasably supportable by said pressing means.

3. A bonding apparatus as claimed in claim 2,
wherein said holders each comprise a threaded portion,
said conveying means comprises a reciprocatable and rotatable shaft having a threaded section for engaging the threaded portions of the holders when rotated to grasp the same, and reciprocating means for reciprocating said shaft along said conveying path to convey the holders respectively grasped thereby from said preparatory chamber to said vacuum bonding chamber.

4. A bonding apparatus as claimed in claim 3,
wherein said first stage means and said pressing means each have arm means for preventing the respective holders to which the substances are mounted from rotating in a direction in which threads of the threaded portions of the holders extend when releasably supported thereby.

5. A bonding apparatus as claimed in claim 4, wherein the arm means of the pressing means comprise first and second arms movable toward and away from each other.

6. A bonding apparatus as claimed in claim 2, wherein said preparatory chamber comprises a rotatable preparatory table, and a plurality of stages mounted to said preparatory table for releasably supporting the substances, said rotatable preparatory table for successively moving said plurality of stages into said conveying path.

7. A bonding apparatus as claimed in claim 1, and further comprising a superhigh vacuum evacuating apparatus for maintaining said vacuum bonding chamber under a vacuum that is at least $10^{-9}$ mmHg.

8. A bonding apparatus as claimed in claim 1, and further comprising vacuum means for maintaining said preparatory chamber under a vacuum that is at least $10^{-8}$ mmHg.

* * * * *